March 16, 1965  J. G. LORD  3,173,530
VENDING MACHINE

Filed June 4, 1963  13 Sheets-Sheet 1

INVENTOR.
J. G. LORD
BY
ATTY.

INVENTOR.
J. G. LORD
BY
ATTY.

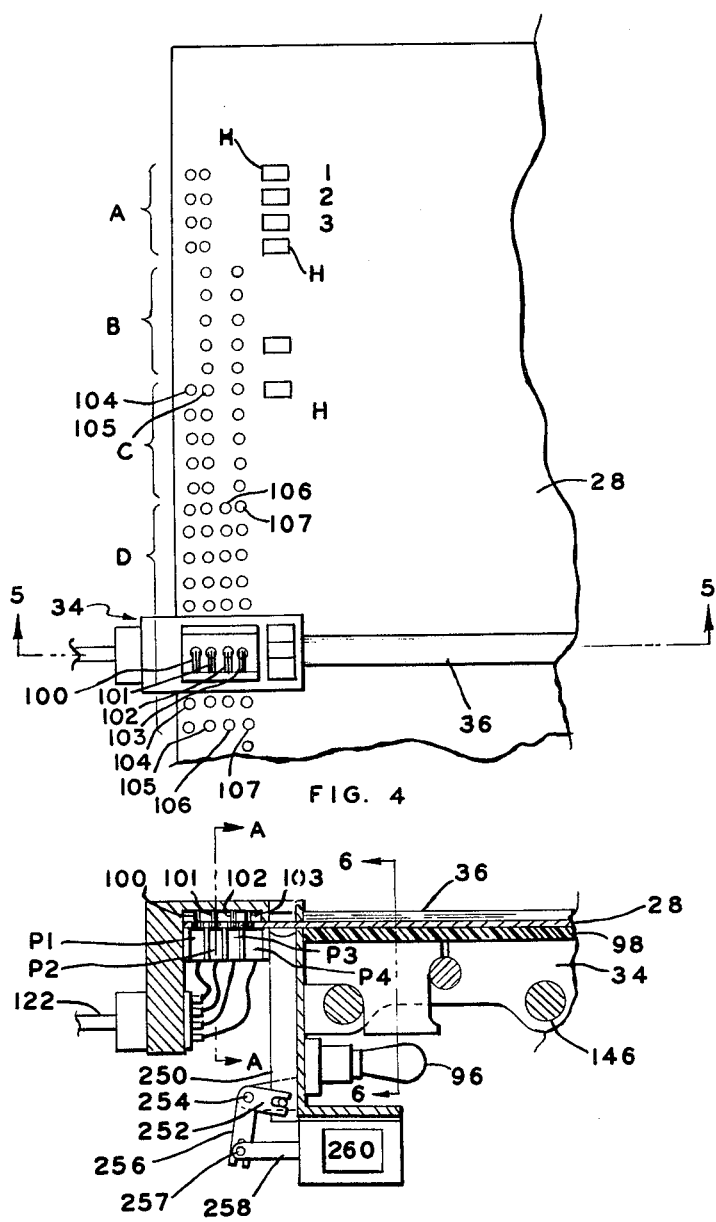

March 16, 1965 J. G. LORD 3,173,530
VENDING MACHINE
Filed June 4, 1963 13 Sheets-Sheet 5

INVENTOR.
J.G. LORD
BY
ATTY.

March 16, 1965     J. G. LORD     3,173,530
VENDING MACHINE

Filed June 4, 1963     13 Sheets-Sheet 6

INVENTOR.
J.G. LORD
BY
ATTY.

March 16, 1965  J. G. LORD  3,173,530
VENDING MACHINE

Filed June 4, 1963  13 Sheets-Sheet 7

INVENTOR.
J. G. LORD
BY
ATTY.

March 16, 1965   J. G. LORD   3,173,530
VENDING MACHINE

Filed June 4, 1963   13 Sheets-Sheet 8

INVENTOR.
J.G. LORD
BY
ATTY.

March 16, 1965 J. G. LORD 3,173,530
VENDING MACHINE

Filed June 4, 1963 13 Sheets-Sheet 9

INVENTOR.
J.G. LORD
BY
ATTY.

March 16, 1965 J. G. LORD 3,173,530
VENDING MACHINE

Filed June 4, 1963 13 Sheets-Sheet 10

INVENTOR.
J. G. LORD
BY
ATTY.

INVENTOR.
J. G. LORD

March 16, 1965 J. G. LORD 3,173,530
VENDING MACHINE
Filed June 4, 1963 13 Sheets-Sheet 13

INVENTOR.
J. G. LORD
BY Louis Necho
ATTY.

United States Patent Office 3,173,530
Patented Mar. 16, 1965

3,173,530
VENDING MACHINE
John G. Lord, Swarthmore, Pa., assignor to Shoup Voting Machine Corporation, New York, N.Y., a corporation of New York
Filed June 4, 1963, Ser. No. 285,394
7 Claims. (Cl. 194—2)

This invention relates to a coin-operated vending machine.

One object of the invention is to provide an improved machine of the type set forth.

A further object is to produce a vending machine which can vend articles, the prices, shapes and sizes of which vary within a fairly broad range.

A still further object is to produce a vending machine which will maintain an inventory record of the merchandise initially stocked in the machine whereby the owner of the machine can ascertain at a glance which items have been sold and which remain available and so that an inventory record may be readily checked against cash receipts.

A still further object is to produce a vending machine which will visibly indicate to prospective purchasers whether a given item is in, or out of, stock, so as to save the trouble involved in depositing money only to have it returned.

A still further object is to produce a vending machine which will indicate to the purchaser the price of the item selected before the purchaser has deposited any money and will receive and will progressively total up coins deposited to show the purchaser the amount deposited as compared with the price of the selected article.

A still further object is to produce an improved machine which permits a prospective purchaser to change his mind and get his money back, regardless of how much may have been paid on account, at any time before setting the purchased article delivery mechanism in motion.

A still further object is to produce a vending machine in which the article-selecting and article-delivering mechanisms are interlocked for simultaneous operation and in which the merchandise delivery and coin return mechanisms are interlocked whereby delivery of the article to the purchaser immobilizes the coin return mechanism, and vice versa.

A still further object is to produce a vending machine, the control mechanism of which incorporates the principles of binary arithmetic whereby the price and money deposited indicating mechanism is rendered very compact and versatile.

The full nature of the invention will be understood from the following specification and the accompanying drawings in which:

FIG. 4 is a fragmentary enlargement looking in the direction of line 4—4 on FIG. 3, better to show the merchandise price list and the scanning, or read-head, associated therewith.

Figure 5A:
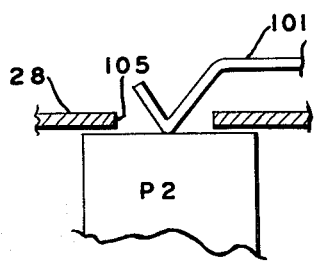
FIG. 5 is an enlarged sectional view looking in the direction of line 5—5 on FIG. 4, and showing details of construction.

FIG. 5-A is a sectional view looking in the direction of line A—A on FIG. 5.

Figure 6:
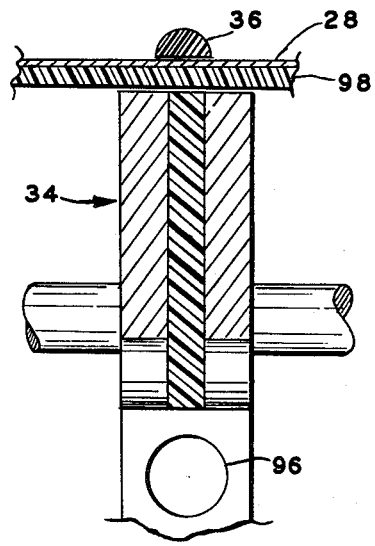

FIG. 6 is an enlarged, sectional view looking in the direction of line 6—6 on FIG. 5 and showing details of construction.

Figure 1:
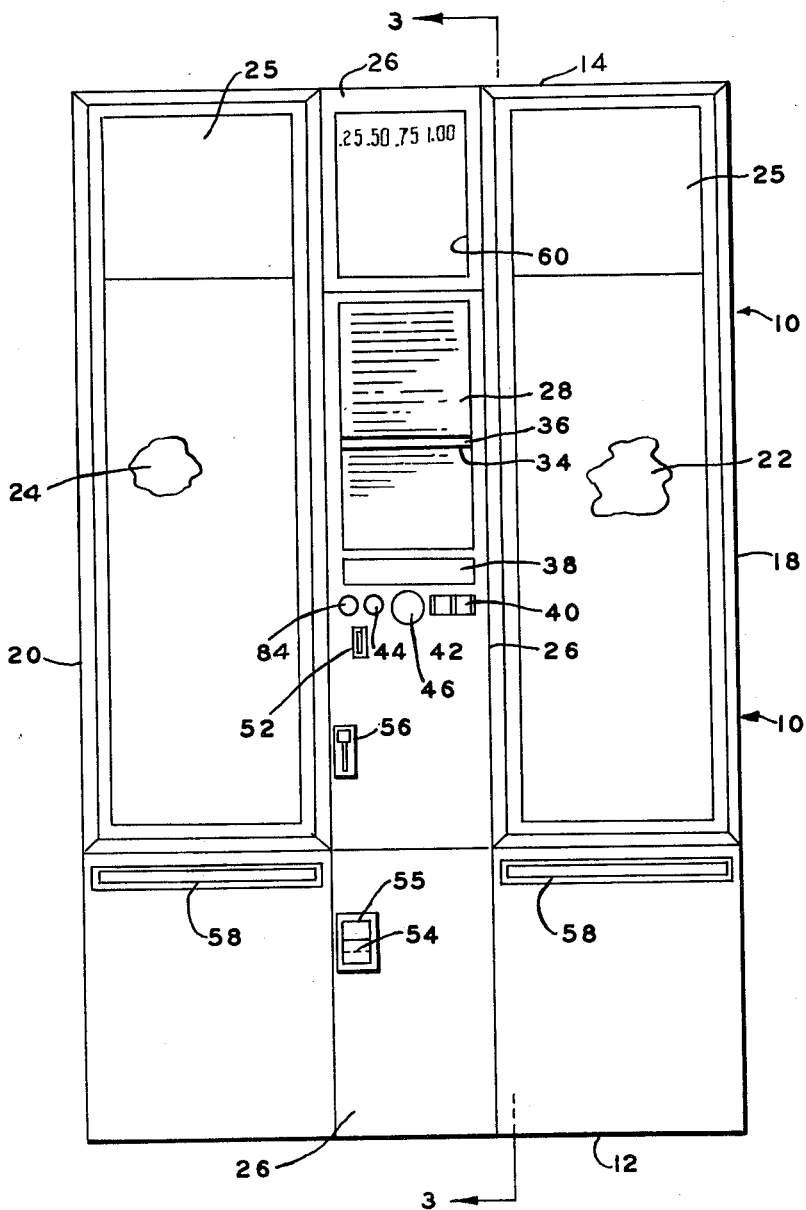
FIG. 1 is a front elevational view of a vending machine embodying the invention.
Figure 7:
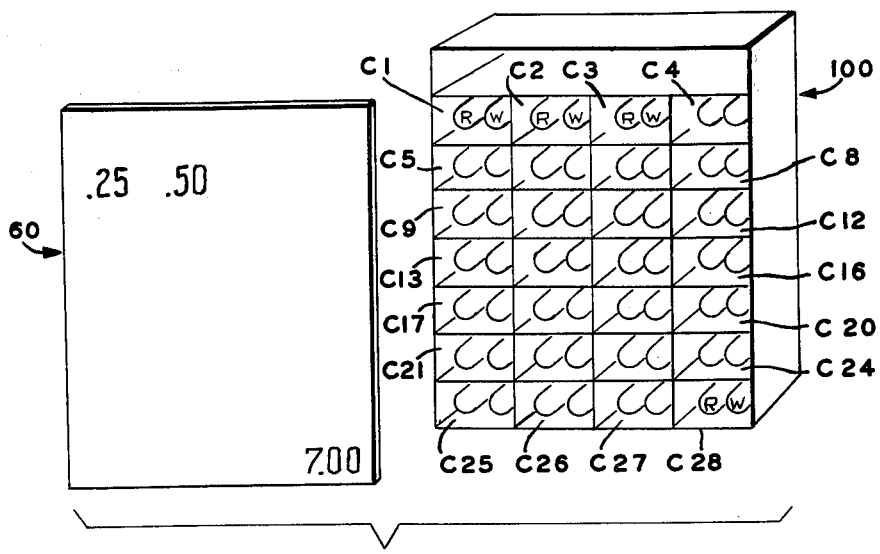

FIG. 7 is an enlarged, exploded, perspective view of the upper central portion of FIG. 1, showing details of the mechanism which indicates the price of a selected article and the amount of money deposited in the machine by the purchaser.

Figure 8:
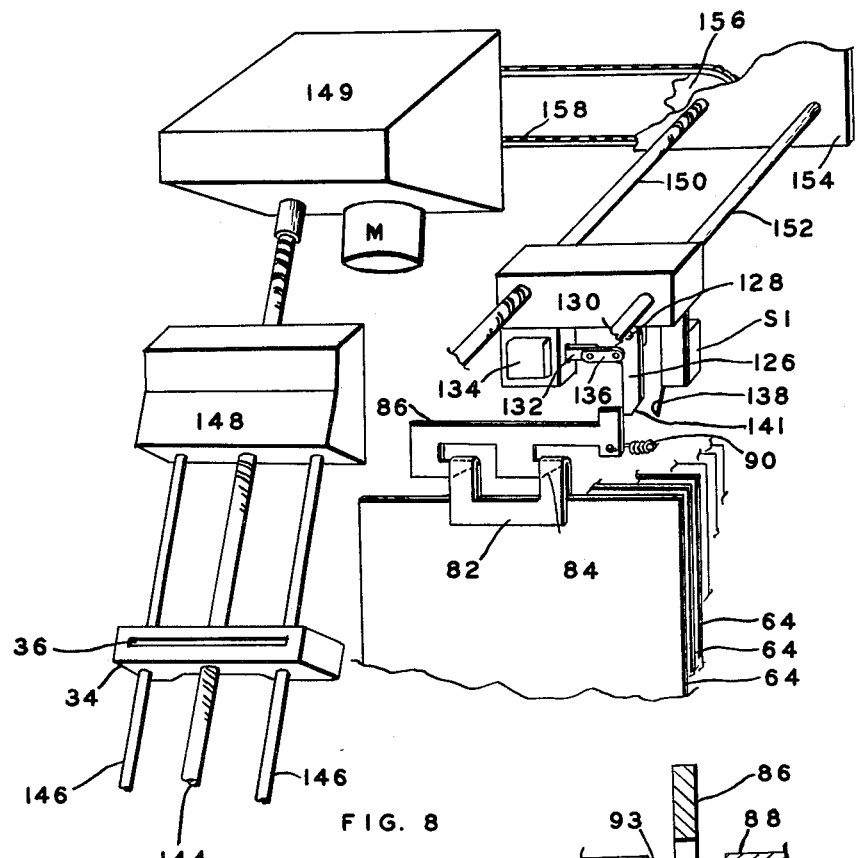

FIG. 8 is an enlarged, exploded, perspective view showing the article selecting and the purchased article releasing mechanism, certain parts being omitted.

Figure 9:
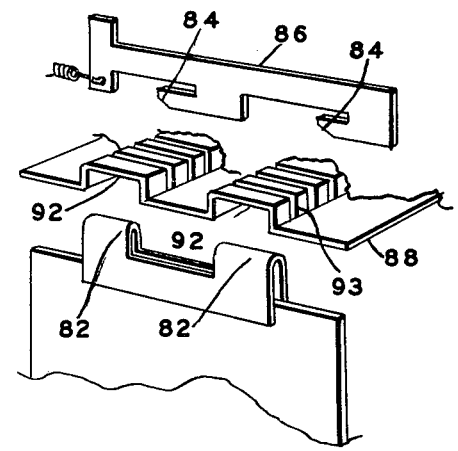

FIG. 9 is a fragmentary, exploded, perspective view of some of the parts shown in the lower right-hand portion of FIG. 8 and a part not shown in FIG. 8.

Figure 10:
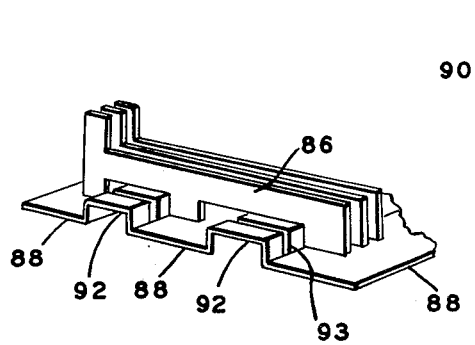

FIG. 10 is a perspective view showing the two uppermost parts of FIG. 9 assembled.

Figure 11:
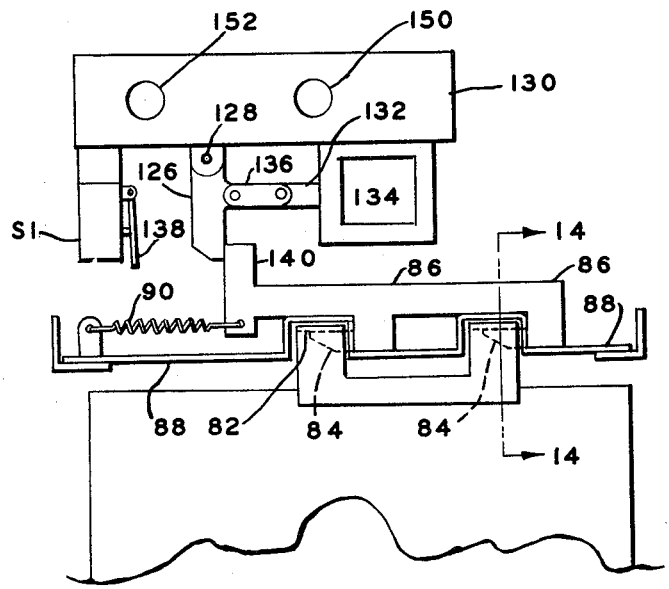
Figure 12:
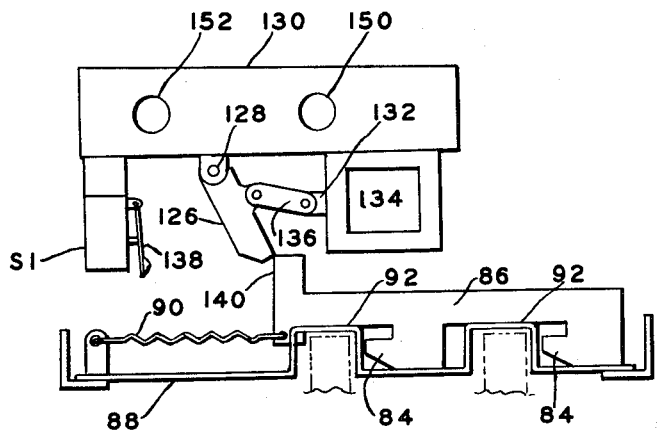
Figure 13:
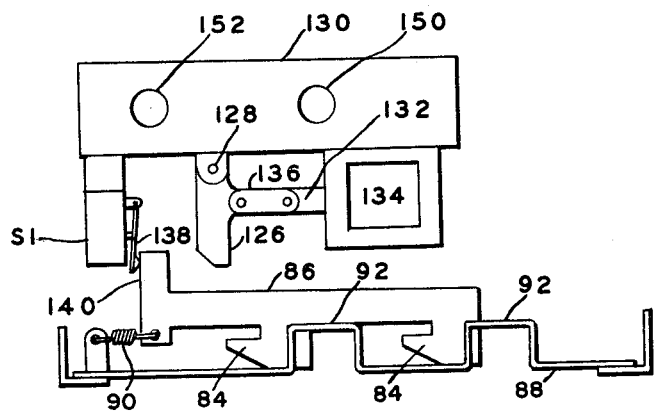

FIGS. 11, 12 and 13 are enlarged, fragmentary and diagrammatic front elevational views showing, step by step, the manner in which the merchandise articles to be sold are stocked in the machine and the manner in which a purchased article is released to the purchaser by the mechanism shown in the right half of FIG. 8.

Figure 14:
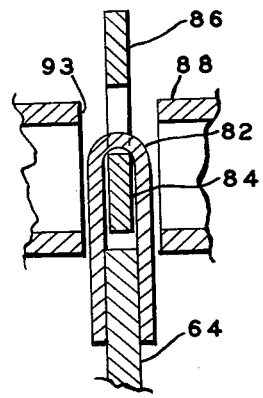

FIG. 14 is a sectional view looking in the direction of line 14—14 on FIG. 11 and showing details of construction.

Figure 3:
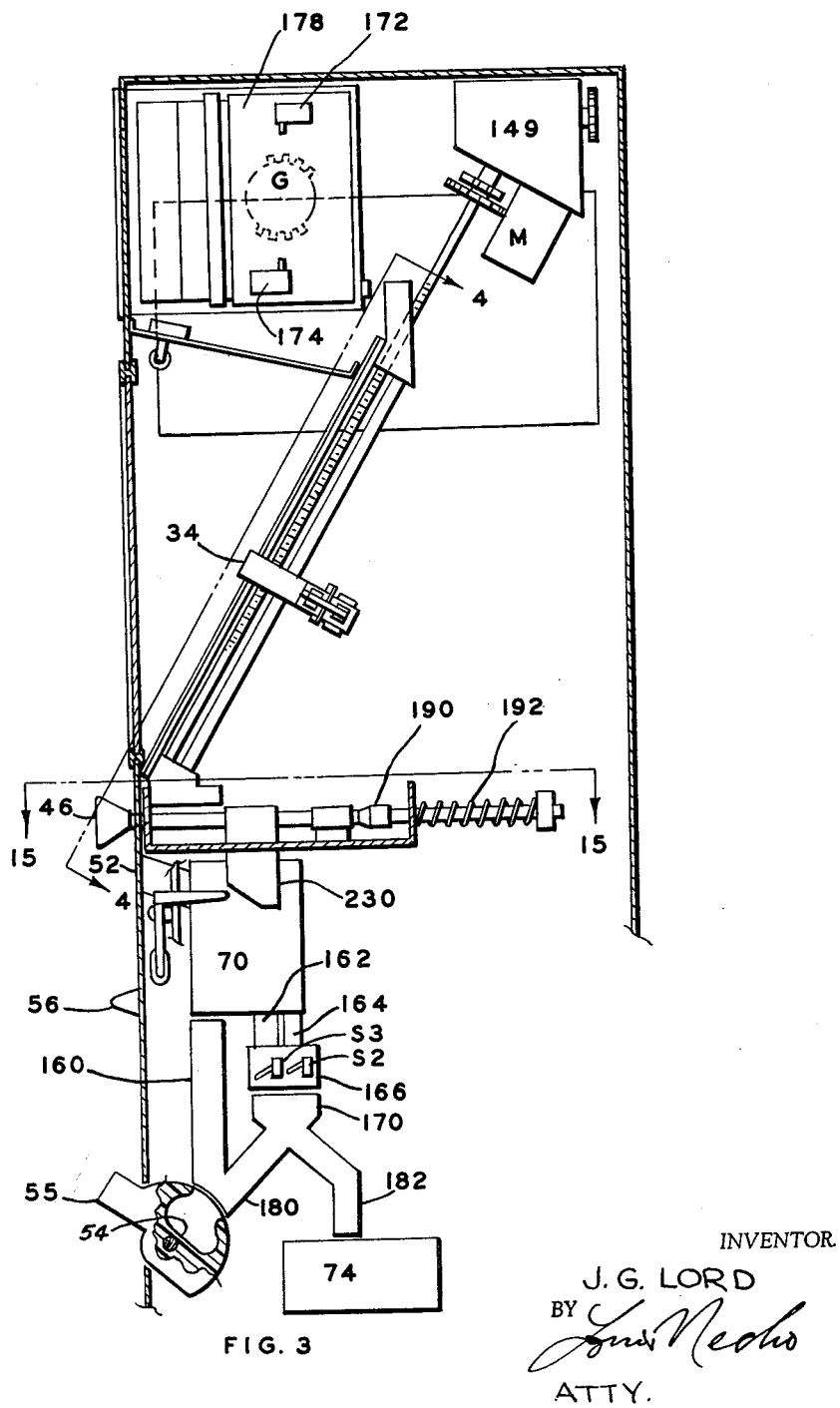
FIG. 3 is an enlarged, sectional view looking in the direction of line 3—3 on FIG. 1.
Figure 15:
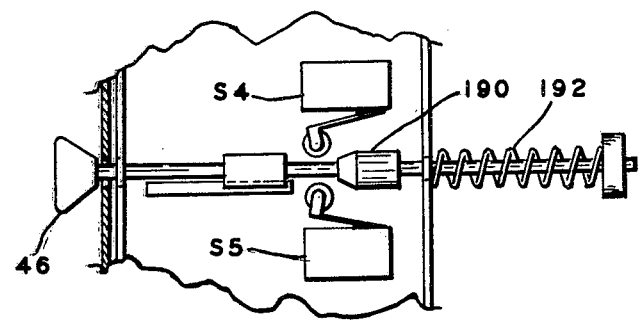

FIG. 15 is a fragmentary view, partly in section and partly in top plan, looking in the direction of line 15—15 on FIG. 3 and showing details of the pull-out lever which the purchaser manipulates to secure delivery of the article purchased.

Figure 16:
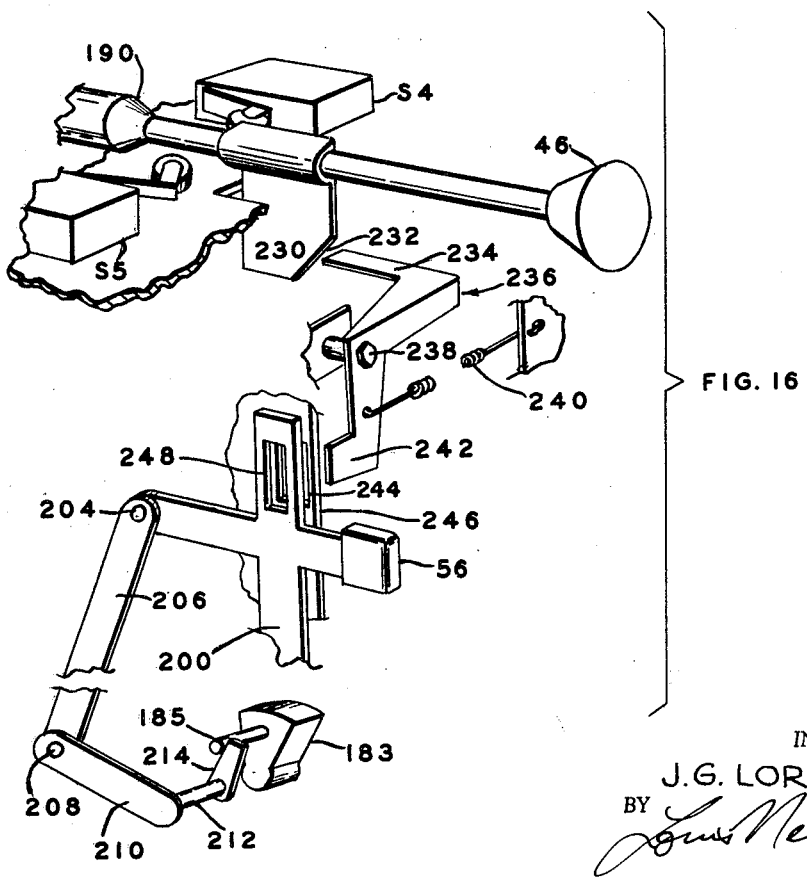

FIG. 16 is an enlarged, fragmentary, perspective view showing how the pull-out lever of FIG. 15 is interlocked with the coin return mechanisms whereby the delivery of a purchased article prevents return of the money paid for said article, and vice versa.

Figures 17, 18, 19:
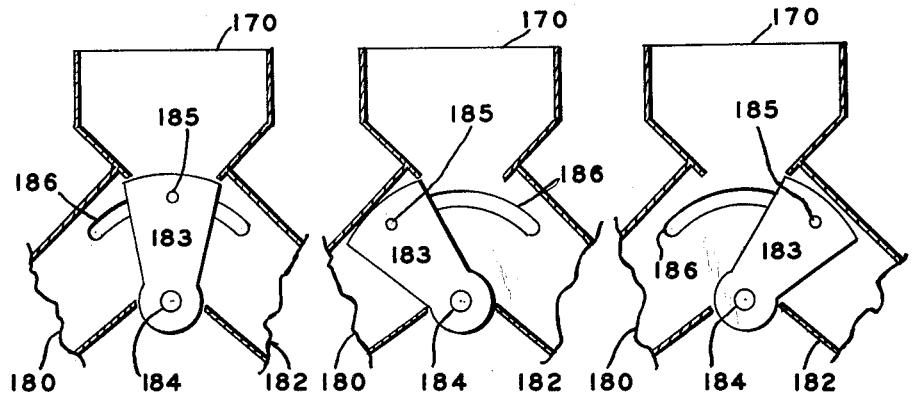

FIG. 17, 18 and 19 are enlarged, fragmentary views showing details of the mechanism which returns or accepts coins deposited into the machine and its relation to the pull-out lever which effects delivery of the article paid for.

Figure 20:
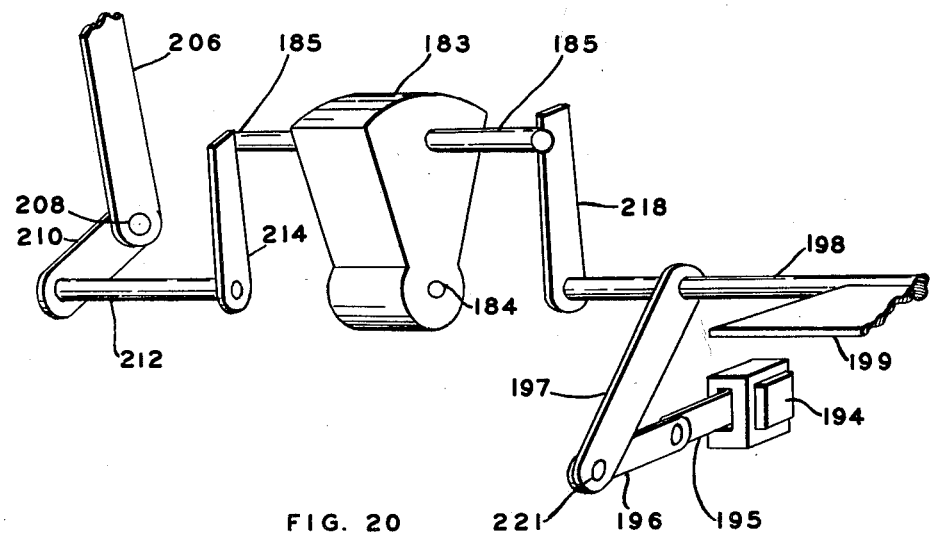

FIG. 20 is an enlarged perspective view showing the mechanism which actuates the gate shown in FIGS. 17, 18 and 19.

Figure 21:
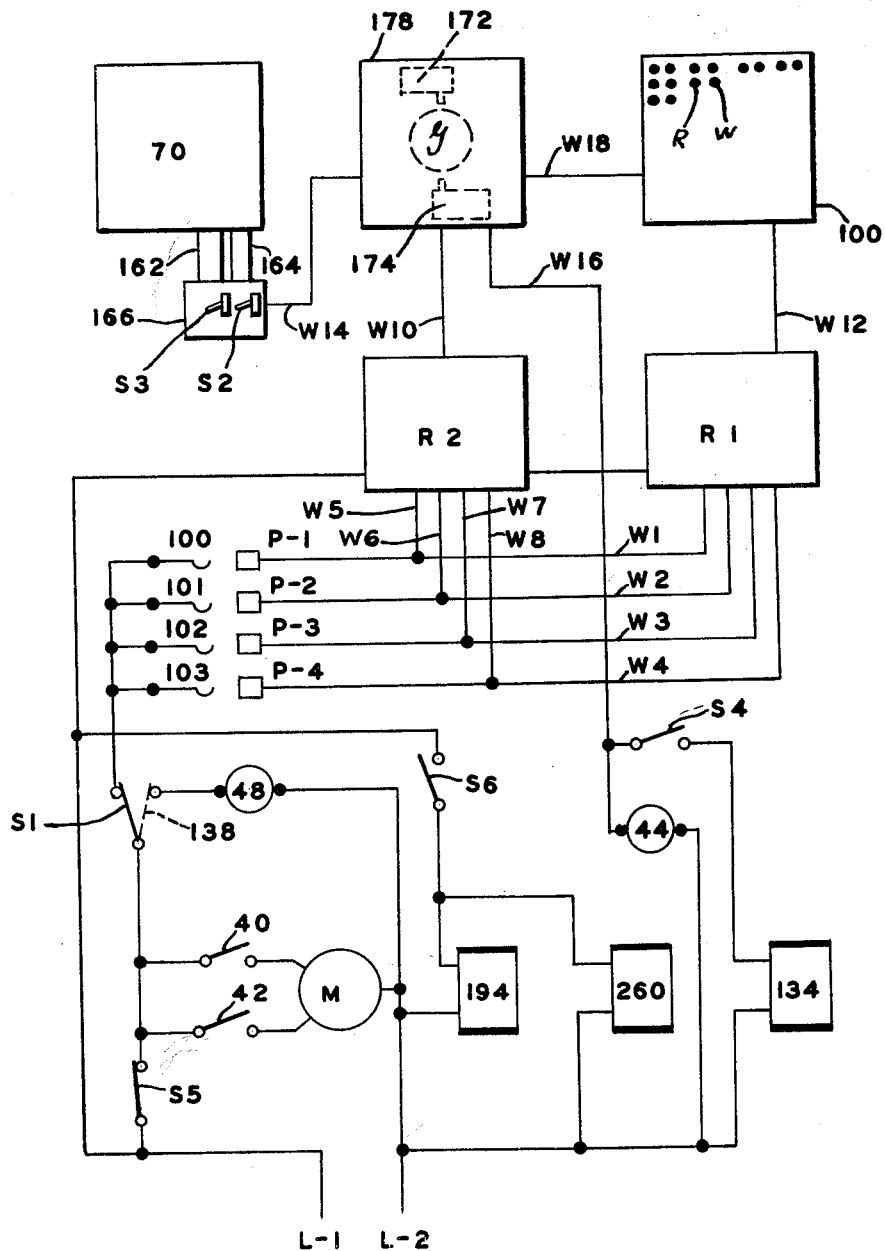
Figure 22:
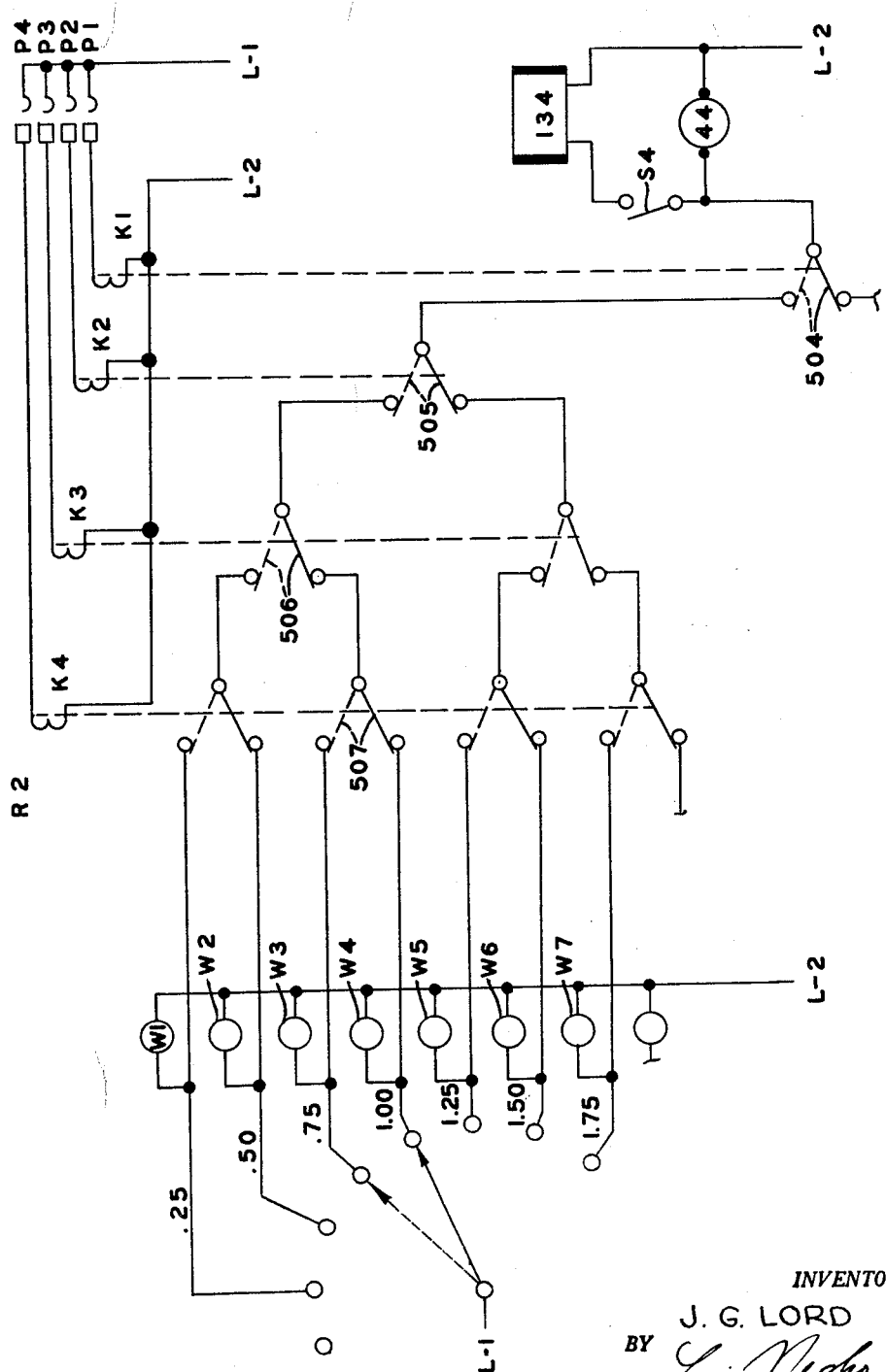
Figure 23:
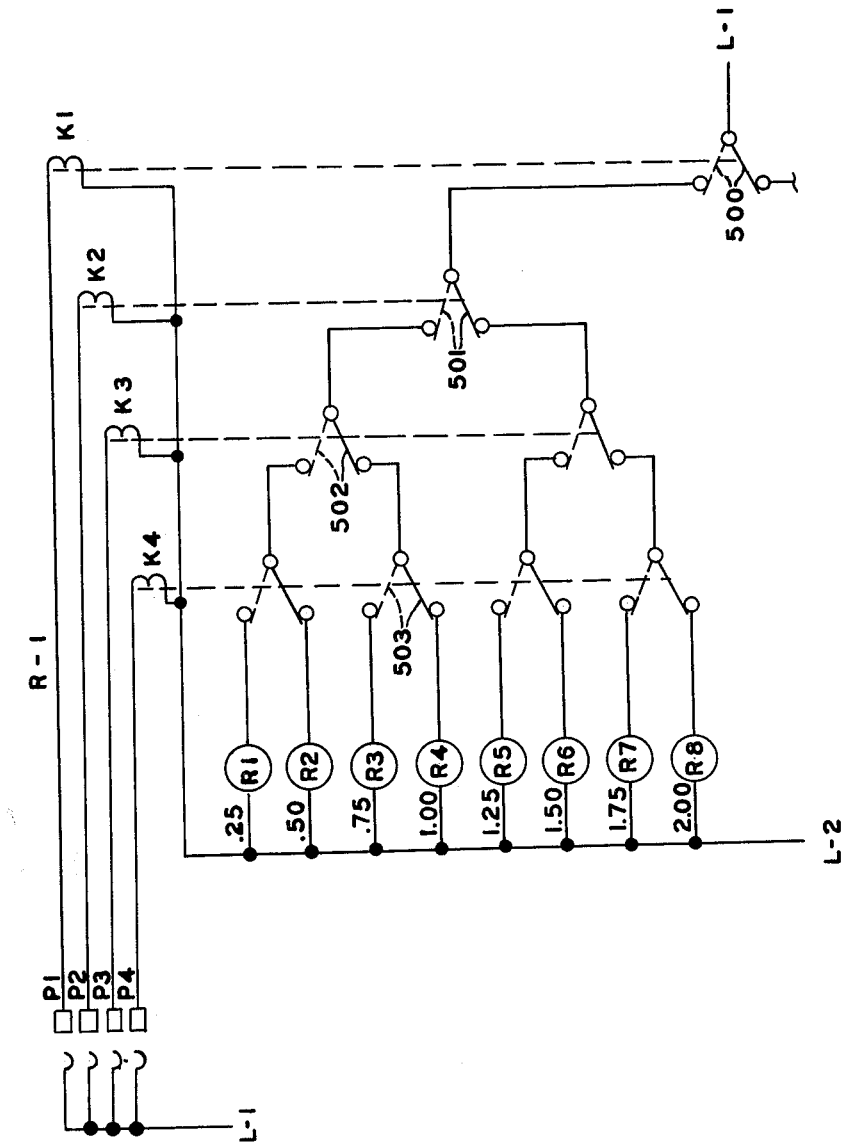

FIGS. 21 to 23 are diagrammatic views showing only that much of the circuitry as is necessary to explain the operation of the machine.

*The main parts of the machine*

Figure 2:
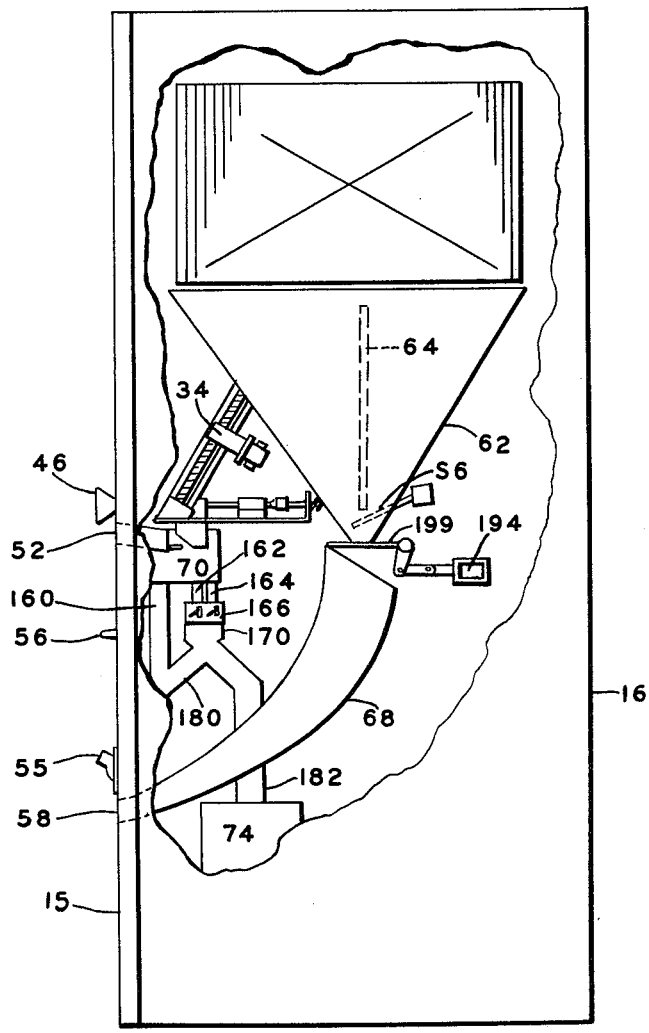
FIG. 2 is a side elevational view of the same, certain parts being omitted and other parts broken away to show details of construction.

As can be seen from FIGS. 1 and 2, the machine includes a casing 10 having a bottom wall 12, a top wall 14, a front wall 15, a rear wall 16 and side walls 18 and 20. Interiorly, the casings can be considered as having identical right and left storing and vending compartments 22 and 24 for receiving the merchandise to be sold, and a central compartment 26 which houses the operating mechanism. The upper portions of compartment 22 and 24 are permanently closed by decorative and advertising panels 25 and the upper portion of central compartment 26 is closed by a translucent panel which is shown in FIG. 7 and which shows the price of an article selected by a purchaser and shows the money paid on account of the price of the article. Below this panel which is hereinafter further referred to, there is an illuminated price list 28 which is enlarged in FIG. 4 and which exhibits the items available and their respective prices. The remaining portion of the front of the machine is taken up with fixed panels, or with conventional doors which are neither shown nor described.

The machine also includes a movable article selecting head 34 which carries a magnifying glass 36 and is enlarged in FIGS. 4, 5 and 6; an operation instruction plate 38; a push button switch 40 for causing article selecting head 34 to move upwardly relative to price list 28; push button switch 42 for causing the article selecting head to move downwardly relative to said price list; a "vend" lamp 44 which is energized to notify the purchaser that the proper price of the selected article has been paid in full and that the machine is ready to deliver the article; a pullout delivery lever 46 which is enlarged in FIGS. 15 and 16 and which is operative to effect delivery of the purchased article; a "sold" lamp 48 which is energized only when the selecting head is brought into registration with the name of an article which is not in stock, so as to indicate to a purchaser that the particular item is not available; a coin receiving slot 52; a rotary return trough 54 adapted to receive returned coins and having an actuating arm 55, FIG. 3; a lever 56 for actuating a manual coin return mechanism which is shown in FIG. 16; a large merchandise delivery opening 58, and a translucent, price and money-deposited indicating panel 60 which closes central compartment 26 above price list 28 and which is enlarged in FIG. 7.

Not visible in FIG. 1, but shown in FIG. 2, are an article delivery hopper 62 for receiving an article of merchandise which has been selected and paid for, such as a phonograph record 64, or the like; a delivery chute 68 leading from said hopper to delivery opening 58; a slug rejecter 70 and a coin accepting vault 74.

Stocking the machine—FIGS. 8–14

The articles to be sold, such as phonograph records, books, etc., are suspended by means of handles each of which includes spaced tabs 82 and which are secured to the article 64, or to the envelope thereof. Tabs 82 are hollow or are provided with openings or notches, which are adapted to be engaged by the hooks 84 of a bracket 86 which is slidable on the flat portions of a shelf 88 which is secured near the top of compartment 22 or 24, or both. Each bracket 86 is constantly biased to the left, as shown in FIGS. 9 and 11 (to the right, as viewed in FIG. 8) by a spring 90. Shelf 88 is provided with spaced humps 92 which are provided with registering slots 93 through which the aligned hooks 84 of brackets 86 are freely passable, FIG. 14. To mount an article 64 to be sold in the machine, an empty bracket 86 is pulled to the right, as shown in FIGS. 9–14, until its hooks 84 clear slots 93 in humps 92 of shelf 88. With the bracket held in this position, the tabs 82 of a handle secured to a record 64, or the like, are moved upwardly through aligning slots 93 in humps 92 until the openings in the tabs register with hooks 84. With tabs 82 held in this position, bracket 86 is released and moves, under the influence of spring 90, to the left, or to the position of FIG. 11, in which hooks 84 enter the holes in tabs 82 to suspend a record, or other object, 64 from shelf 88, as shown in FIGS. 9 to 14. Obviously, if a loaded bracket 86 is moved to the right, or from the position of FIG. 11 to the position shown in FIG. 12, hooks 84 will move out of the holes in corresponding tabs 82, thus permitting the record 64 carried by said tabs to drop into hopper 62 which leads to delivery chute 68 and opening 58, FIG. 2.

The price and payment indicator—FIG. 7

Back of price and payment indicating panel 60 of FIG. 1 is a box-like structure 100 which is divided into compartments C–1 to C–28, each of which has a red lamp R and a white lamp W. Lamps R are energized when scanning head 34 is moved into registration with an item on price list 28 to illuminate the price of the item on panel 60. Lamps W are energized to show the amount paid by the customer on account of the price. For example, if the item selected by scanning head 34 is worth 75¢, lamp R in compartment C–3 will be energized and numerals 0.75 which register with compartment C–3, will be visible in red on panel 60. When the purchaser deposits 25¢, lamp W in compartment C–1 is energized to show the receipt of 25¢. When the purchaser deposits another 25¢, lamp W in compartment C–2 will be energized to show the receipt of a total of 0.50 against the purchase price of 0.75. When the purchaser pays another 25¢, lamp W in compartment C–3 will be energized to show that the full price has been paid, and so on. It will be noted that, as a lamp W in a higher price compartment is energized, the previously energized lamp W in a lower price compartment is extinguished so that only the price will be visible in red and the total value of the coins deposited on account will be visible at any one time. The manner in which these results are accomplished is set forth below.

The article selecting head—FIGS. 4, 5 and 6

The article selecting, or price list scanning, head 34 also includes lamp 96 which, through translucent plates 98, constantly illuminates price list 28. Scanning, or selector head 34 also carries flexible contacts 100, 101, 102 and 103 which are adapted to pass through any one or more of openings 104, 105, 106 or 107 in price list 28 to engage any one or more of binding posts P–1, P–2, P–3 and P–4, depending on the position of the scanning head relative to list 28. For example, if the scanning head registers with item D, all the contacts 100 to 103 will pass through all of the holes 104, 105, 106 and 107 of the price list to engage all of the pins P–1 to P–4. If selector head 34 is moved into registration with an item C, only contacts 100, 102 and 103 will pass through the corresponding openings 104, 105 and 107 in list 28 and will engage pins P–1, P–2 and P–4 only, and so on. It will be noted that items which have the same hole arrangement sell at the same price. Pins P–1 to P–4 are electrically connected, by a four strand cable 122, to various circuits hereinafter described. At this point, it need only be noted that the openings in the price list represent binary bits and that the arrangement is such that, when selecting head 34 registers with an article D, lamp R in box 100 which corresponds to the article selected by head 34 will be energized. As previously stated, energization of a red lamp in a given compartment illuminates the price of the article on panel 60. In other words, movement of selecting head 34 into registration with an article on list 28 immediately indicates its price on panel 60.

The article releasing mechanism—FIG. 8

The mechanism for releasing an article which has been paid for includes a lever 126 which is pivoted at 128 to traveling block 130 and which is also pivotally connected to the armature 132 of a solenoid 134 by link 136. Traveling block 130 also carries a two position switch S–1, the contact arm 138 of which is normally biased to a first position (to the right, as viewed in FIGS. 11 and 12). The contact arm 138 of switch S–1 is in the path of movement of bracket 86 so as to be moved to a second position, as shown in FIG. 13, by the head 140 of bracket 86 when the latter is moved by spring 90 in the absence of tabs 82 which retain bracket 86 in the intermediate position of FIG. 11. The structure and operation of switch S–1 and the parts with which it cooperates are later on described. For the present, it is enough to note that, when switch arm 138 of switch S–1 is in its first position, it supplies energy to binding posts P–1 to P–4 and that, in its second position, switch S–1 de-energizes pins P–1 to P–4 and energizes "sold" lamp 48 to apprise a prospective purchaser that the article selected by scanning head 34 is not available. It will be noted that, when solenoid 134 is de-energized, its armature 132 is extended and lever 126 engages the left side of head 140 of bracket 86, as viewed in FIGS. 8 and 11. It is also to be understood that arm 126 is incapable of movement in clockwise direction beyond the vertical position shown in FIGS. 11 and 13. As above stated, the engagement of hooks 84 with tabs 82 prevents bracket 86 from moving toward switch arm 138 in response to the tension of spring 90. Conversely, when solenoid 134 is energized and moves bracket 86 to the right, FIG. 11, until hooks 84 thereof clear tabs 82, the tabs move down through slots 93. This eliminates all obstructions and spring 90 now moves bracket 86 to the left until it engages switch arm 138, as shown in FIG. 13, in which "sold"

lamp 48 is energized. By this arrangement, whenever scanning head 34 registers with the name, or number of an item which is out of stock, "sold" lamp 48 will be energized to indicate that the item is not available before the purchaser deposits any money. In other words, an unloaded bracket 86, that is, one which is not supporting an article, will at all times be in the position of FIG. 13 in which it is beyond the reach of lever 126 and will not be affected by repeated energization of the solenoid. It will be noted that the end of lever 126 which engages the end 140 of brackets 86 is bevelled, as at 141, to facilitate the movement of bracket 86, to the right in FIGS. 11, 12 and 13, past the lower end of lever 126.

*The means for actuating the article selector and the article releasing mechanisms—FIGS. 5 and 8*

As can be seen from FIGS. 5 and 8, article selecting head 34 threadedly engages screw shaft 144 and is slidable on stabilizing rods 146 which are carried by mounting block 148. Screw shaft 144 is step-rotated by a gear train in gear box 149 which is driven by reversible motor M in response to the closing of either of switches 40 or 42 to move the scanning head up or down relative to price list 28, FIG. 1. Traveling block 130 which carries the previously mentioned article releasing lever 126 and solenoid 134, etc., threadedly engages screw shaft 150 and is slidable on stabilizing rod 152, both of which are carried by a fixed support 154. Screw shaft 150 is driven, step by step, and synchronously with screw shaft 144, by means of a sprocket 156 which is actuated by a sprocket chain 158 which is also driven by the gear train in box 149. In other words, when push button switch 40 or 42 is closed, article selecting head 34 moves upwardly, or downwardly, until it registers with the selected article on list 28. Simultaneously, traveling block 130 is moved by shaft 150 until its lever 126 registers with the head 140 of the bracket 86 which supports the particular article selected by the scanning head 34 whereby energization of solenoid 134, as hereinafter explained, will cause lever 126 to move the aligned bracket 86 to the article releasing position, or to the right, as viewed in FIGS. 8 and 11. In other words, moving scanning head 34 into registration with the name, or code number, of an article on list 28, automatically brings release lever 126 and solenoid 134 into alignment with the bracket 86 which supports the selected article itself.

*The coin handling mechanism—FIGS. 2, 3, and 16 to 20*

In addition to the coin return through 54, slug rejector 70 and coin receiving vault 74, the coin handling mechanism includes a chute 160 for delivering rejected slugs, or unacceptable coins, to return trough 54; a large chute 162 for delivering large acceptable coins, such as half dollars, and a small chute 164 for delivering small authentic coins, such as quarter dollars, from slug rejector 70 to a coin sorter 166. Coin sorter 166 is in the nature of a passage which leads from the slug rejector to an "escrow" or temporary coin receiver 170 and is provided with two normally open switches S-2 and S-3 which are adapted to be closed by quarter and half dollars passing down through chutes 164 and 162, respectively. The manner in which switches S-2 and S-3 operate is hereinbelow described. It is enough now to note that switches S-2 and S-3 are connected to solenoids 172 and 174, FIG. 3, so that when a quarter dollar closes switch S-2, solenoid 172 will move gear G of the stepper switch of a conventional totalizer 178 one notch and so that closing switch S-3 by a half dollar will move gear G through two notches. The totalizer is a purchased item, forms no part of this invention and is therefore not shown nor described.

As best shown in FIGS. 3 and 17 to 19, inclusive, temporary coin receiver 170 is connected by chute 180 to coin return through 54 and by chute 182 to money receiving vault 74. The direction in which the coins are channeled is controlled by a gate 183 which is pivotally mounted, as at 184, and carries a shaft 184 which is freely movable in slots 186 in opposite walls of the temporary coin receiver 170. The manner in which the gate is operated is described in detail below. It is now only necessary to note that in the position of FIG. 17, the gate obstructs both of chutes 180 and 182; that in the position of FIG. 18, the coins will fall into coin vault 74 and that, in the position of FIG. 19, the coins will fall into coin return trough 54. It will be noted that when the parts are in the position of FIG. 17, the purchaser can manually move gate 183 to the position of FIG. 19 so as to get his money back, should he decide not to purchase the item.

*The purchased article delivering mechanism—FIGS. 2, 15*

The mechanism for delivering an article which has been paid for from hopper 62 to the purchaser includes a conical boss 190 which, when lever 46 is pulled outwardly against the tension of spring 192, closes normally open switch S-4 and opens normally closed switch S-5. Switch S-4, when closed, energizes solenoid 134 to release an article carried by a corresponding bracket 86, in the manner previously described, to de-energize pins P-1 to P-4 and to energize sold lamp 48. Closing switch S-4 also energizes solenoid 194, the armature 195 of which is pivotally connected by link 196 to lever 197 which is fixed on shaft 198 to open trap door 199 downwardly, thus permitting the purchased record, or the like, 64 to fall into delivery chute 68 from which it can be retrieved through opening 58. Opening switch S-5 cuts the power to motor M so as to make it impossible to move the scanning head 34 while the article which has been paid for is being delivered.

*The manual coin return mechanism—FIGS. 16, 19 and 20*

The mechanism for permitting a purchaser to change his mind and have his money returned at any time before pulling out delivery lever 46 is best shown in FIG. 16, from which it will be seen that coin return arm 56 is at the end of lever 200 which is pivoted at 204 to one end of a lever 206, the other end of which is pivoted at 208 to link 210 which is fixed on shaft 212. Also fixed on shaft 212 is a lever 214 which is in the path of movement of pin 185 of gate 183, whereby pulling arm 56 to the right, as viewed in FIG. 16, causes gate 183 to be moved from the position of FIG. 17 to the position of FIG. 19, in which chute 182 is obstructed and coins can only run down chute 180 into coin return trough 54, FIG. 3. To retrieve the coins, it is now necessary to rotate the trough in counterclockwise direction by handle 55. It will be noted that when the trough 54 is rotated in money discharging direction, or when it is in its normal position, as shown in FIG. 3, the bottom end of chutes 160 and 180, FIG. 3, will be closed so that tampering with the internal mechanism is impossible.

*The automatic coin accepting mechanism—FIG. 20*

The automatic coin accepting mechanism includes a lever 218 which is fixed on previously mentioned shaft 198 and is disposed in the path of movement of pin 185 so that rotation of shaft 198 will actuate pin 185. Shaft 198 also fixedly carries lever 197 which is pivoted at 221 to link 196 which is pivoted to the armature 195 of previously mentioned solenoid 194. When energized, solenoid 194 moves gate 183 from the position of FIG. 17 to the position of FIG. 18 in which coin return chute 180 is closed and chute 182 which leads to money vault 74 is open, whereby the coins run down chute 182 into the money vault. Solenoid 194 is energized by the closing of normally open switch S-6 by an object 64 passing downwardly through hopper 62. Since shaft 198 also carries trap door 199, it follows rotation of shaft 198 and simultaneously accepts the money and opens delivery door 199. By this arrangement, it is impossible for the machine to accept money without delivering the article paid for and it is impossible to deliver an article unless it has been paid for.

*The means for preventing article delivering and coin return simultaneously—FIG. 16*

In order to prevent a purchaser so inclined from pulling coin return arm 56 and article delivery lever 46 out simultaneously so as to get an article of merchandise without having paid for it, lever 46 is provided with a pendant plate 230, the lower edge of which is bevelled, as at 232, and is engageable with one arm 234 of a bell crank 236 which is pivoted at 238 to the frame of the machine. The bell crank, as a whole, is biased in counter-clockwise direction by a spring 240. The other arm 242 of the bell crank lever is adapted to enter slot 244 in a fixed plate 246 and a slot 248 in previously mentioned lever 200. The arrangement of the parts mentioned is such that, when gate 183 is in the position of FIG. 17, slots 244 and 248 will be in registration and will freely receive the arm 242 to permit rotation of bell crank lever 236. This means that lever 46 can be pulled out (to the right as viewed in FIG. 16, to the left as viewed in FIG. 3). Since slot 244 is in fixed plate 246, and since slot 248 is in lever 200, it follows that engagement of arm 242 with slot 248 will immobilize lever 200 and return coin arm 56. Conversely, if arm 56 is moved outwardly (to the left in FIG. 3, to the right in FIG. 16) slot 248 will move out of registration with slot 244. This blocks the path of arm 242 and hence immobilizes bell crank 236. Immobilization of the bell crank prevents movement of pendant plate 230 and hence immobilizes article delivery lever. It will be noted that locking arm 56 does not affect the operation of solenoid 194 which can still move the gate 183 from the position of FIG. 17 to that of FIG. 18.

*The inventory control—FIG. 5*

The inventory control mechanism includes a punch 250, FIG. 5, which is slidably carried by selector head 34 and is engaged by a clevis 252 which is pivoted at 254 to one end of link 256, the other end of which is connected by clevis 257, to the armature 258 of a solenoid 260 which, when energized, actuates punch 250 upwardly, as viewed in FIG. 5, to punch a hole H across, or adjacent to, the name, or price, or other coded identification of the purchased article. Punching a hole H removes the price or other identification of the corresponding article; informs a prospective purchaser that the article is out of stock; it enables the operator of the machine to see which articles have been sold, and it enables the operator to check the price of the punched out items against the money in vault 74.

*The mechanical operation*

A prospective purchaser looks over the list and when he selects an item, he pushes switch 40 or 42 to move scanning head 34 up or down to bring lens 36 over the desired item. It will be noted that the purchaser is free to change his mind and to keep on pushing switch 40 or switch 42 until he is fully satisfied. If the selected item is worth 25¢, lamp R in compartment C–1 will be energized. If the price is $7.00, lamp R in compartment C–28 will be energized, and so on, for items in between. If the machine is designed for selling articles, the prices of which are multiples of $0.25, the purchaser can use a quarter for a 25¢ item, or a half dollar for a 0.50 item, or a selection of quarter and half dollars which will make up the price required. The coins are deposited in coin slot 52 which leads to slug rejector 70. If the coins are authentic, the quarters will drop through small chute 164 and the half dollars will drop through large chute 162. A quarter falling through chute 164 activates switch S–2 which energizes a solenoid 172 (for example) to turn gear G, FIG. 3, of a conventional stepper switch of a conventional totalizer 178 through one notch. This energizes lamp W in compartment C–1 to indicate that a quarter has been deposited. If this happens to be the price of the article, "vend" lamp 44 is energized to inform the purchaser that he may pull lever 46 out to receive the item. If the price of the item is one dollar, the purchaser deposits another quarter to move gear G through another step. This de-energizes lamp W in compartment C–1 and energizes lamp W in compartment C–2, and so on. It will be remembered that lamp R in compartment C–4 will continue to be lit until four quarters have been received when lamp R in compartment C–4 is de-energized and lamp W in said compartment, and "vend" lamp 44 will both be energized. If the purchaser deposits a half dollar, it closes switch S–3 below large chute 162 to activate solenoid 174 to move gear G through two notches, and so on.

When a white lamp W is energized as a result of the payment of the full price, the operator pulls out lever 46 to secure delivery of the article. But, it will be recalled that unless arm 242 of the bell-crank lever 236 can enter slots 244 and 248, lever 46 cannot be pulled out. This means that lever 46 cannot be pulled out unless gate 183 is in the position of FIG. 17. Pulling out lever 46 causes the selected article to drop into hopper 62 down into chute 68. In passing through chute 68, article 64 closes switch S–6 which causes solenoid 194 to accept the money and to open door 199. Outward movement of lever 46 closes switch S–4 to activate solenoid 134 and the movement of switch 138 to its second position activates "sold" light 48 and cuts the power supply to pins P–1 to P–4. Opening switch S–5 de-activates motor M. In other words, when lever 46 is pulled out, the motor and the binary relays are inactivated.

*The electrical operation of the machine*

The sequence of operations is diagrammatically shown in FIG. 21, from which it will be seen that contact pins P–1 to P–4 are connected to one set of binary relays R–1 by wires W–1, W–2, W–3 and W–4, and that they are connected to another set of binary relays R–2 by wires W–5, W–6, W–7 and W–8. Binary relays R–2 are connected, as at W–10, to totalizer 178, and binary relays R–1 are connected, as at W–12, to the price and payment indicator of FIG. 7. Totalizer 178 is connected, as at W–14, to switches S–2 and S–3 and it is connected, as at W–16, to switch S–4, and is connected to the price and money paid indicator of FIG. 7 by wire W–18.

With power available at L–1 and L–2 and with switch S–5 closed, closing switch 40 or 42 will energize motor M to move scanning head 34 relative to list 28 and if switch S–1 is in the position of FIG. 11 (solid line position of FIG. 21), current will be available at P–1 to P–4 so that when contacts 100 to 103 pass through corresponding holes adjacent the article selected, the circuit of corresponding contact pins P–1 to P–4 will be completed to energize the binary relays. For example, if the lowermost item of group C is selected, contact brushes 100, 101 and 103 will pass through openings 104, 105 and 107 to engage pins P–1, P–2 and P–4 which are connected to wires W–1, W–2 and W–4 and so on.

Completing the circuit through pins P–1, P–2 and P–4 acts through binary relays R–1 to energize the correspondingly coded red lamp R. For example, if the price of the article selected is 75¢, red lamp R in compartment C–3 wil be energized, and so on. Completion of the circuit of pins P–1, P–2 and P–3 also places binary relay R–2 in a position to be energized upon completion of the corresponding circuit by the deposit of the required sum of money in totalizer 178. In other words, as gear G rotates in response to the closing of switches S–2 and S–3, successive circuits are completed through binary relay R–2 to energize successive white lamps W which correspond to the position of the stepper switch. When the full price has been received, totalizer 178 completes the circuit of vend lamp 44. Energization of lamp 44 authorizes the purchaser to pull delivery lever 46 out. Pulling lever 46 out closes normally open switch S–4 and energizes solenoid 134 and bracket 86 to release the selected article which, on its way through hopper 62, closes switch S–6 to energize solenoid 194 which accepts the money and opens delivery door 199. Upon releasing the merchandise, bracket 86 moves contact arm 138 of switch S–1 to the position of FIG. 13 (dotted line position in FIG. 21) in which the power supply to pins P–1 to P–4 is cut off and in which sold lamp 48 is energized. With switch S–1 in the broken line position of FIG. 21, the closing of switch S–6 by article 64 energizes solenoid 260 which operates punch 250 and energizes solenoid 194 which, as previously explained, moves gate 183 to the money accepting position of FIG. 18 and opens trap door 199. Return, or inward movement of lever 46, recloses switch S–5 to reenergize motor M and the movement of scanning head 34 into registration with an item which is available and allows switch S–1 to resume the solid line position of FIG. 1 (position of FIG. 11), again to make current available to pins P–1 to P–4 and binary relays R–1 and R–2.

Binary relays R–1 and R–2 are conventional purchased items but in order to make reference to patents or to manufacturers' catalogues, or other sources, unnecessary, I have illustrated, in a highly diagrammatic manner, the connection between the totalizer, the scanning head, the price indicating lamps, the money paid indicating lamps, and so on.

Thus, and as will be best understood from FIGS. 22 and 23, which illustrate relays R–1 and R–2, respectively, when scanning head 34 is moved into registration with an item in group A on FIG. 4, contact will be established with pins P–1 and P–2 only to energize solenoids K–1 and K–2, FIGS. 22, 23. In the case of relay R–1, energization of solenoids K–1 and K–2 moves switches 500 and 501 from the solid to the broken line positions of FIG. 23 and current now can flow from line L–1 through switches 500, 501, 502 and 503 (the latter two switches being in their solid line positions because solenoids K–3 and K–4 are not energized) and through price indicating lamp R–4 to line L–2. This energizes lamp R–4 in compartment C–4 to indicate that the price of the item selected by scanning head 34 is $1.00. In the case of relay R–2 which controls lamps W to indicate the amount of money paid in, energization of solenoids K–1 and K–2 also moves switches 504 and 505 from the solid to the broken line positions of FIG. 22. In this position, vend lamp 44 which is connected to line L–2 will also be connected, through switches 504, 505, 506 and 507 to money paid indicating lamp W–4. But because the circuit is incomplete, neither lamp 44, nor lamp W–4 will be energized. But, when four quarters, or two half dollars are paid in, contact arm 275 of totalizer 178 will have been moved (by switches S–2 and S–3) from the position shown in broken line to the position shown in solid line position of FIG. 22. This completes the circuit and energizes lamp W–4 to show that the full price of $1.00 has been paid and it energizes "vend" lamp 44 to inform the purchaser that he may not pull lever 46 outwardly to effect delivery of the item paid for. As above set forth, pulling lever 46 closes switch S–4 and energizes solenoid 134 which releases the item (FIGS. 12 and 13) and closes switch S–1 to indicate to future purchasers that the item in question has been sold.

The foregoing is only one example, but it will be clear to those skilled in the art that if contact is made with pins P–3 and P–4, or with pins P–1 and P–3, etc., other circuits will be set up which will energize the corresponding red lamp according to the position of the scanning head 34 and which will energize the corresponding white lamp when the money deposited equals the amount indicated by the energized red lamp which takes place when contact arm 275 reaches the desired position (by the payment of money to energize switch S–2 or S–3). By this arrangement, with only four contact openings 100, 101, 102 and 103 which lead to four binding posts P–1, P–2, P–3 and P–4, a large number of permeations is available, which makes possible the sale of items, the prices of which vary from one quarter of a dollar to several dollars. This is made possible by the ingenius use of the binary relays so that, while the structure of the relays is not, per se, a part of this invention, the combination of relays having the specified characteristics with the other elements of the present organization is considered to be part of the present invention.

What I claim is:

1. A vending machine including, in combination,
  a list displaying the names of a plurality of items available for sale,
  a scanning head movable over said list and into registration with a selected item on said list,
  first, normally unilluminated visual signals bearing the prices of the articles on said list,
  means operable by the registration of said scanning head with the name of an item on said list to illuminate, and render visible, the price of said item,
  a coin receiving mechanism,
  second normally unilluminated visual signals bearing indicia representing units of currency and fractions thereof,
  means operable upon deposit of predetermined sums of money in said mechanism for energizing selected second signals to indicate the amount of money deposited in said coin receiving mechanism on account of the price of the article,
  a third normally unilluminated signal, and
  means operable upon deposit of the full price of a selected item to energize said third signal to apprise the purchaser that the machine is ready to deliver the item selected and paid for.

2. A vending machine including:
  a list displaying the names of the plurality of items available for sale,
  a scanning head movable over to said list and into registration with a selected item on said list,
  a purchased article delivering mechanism,
  list-modifying means movable with said scanning head and operable to modify the list in a manner to indicate that the purchased article is no longer in stock, and
  means operable upon delivery of the purchased article for activating said list modifying means.

3. A vending machine including:
  a list displaying the names of items available for sale,
  a scanning head movable into registration with an item on said list,
  a motor for moving said scanning head relative to said list,
  a delivery hopper,
  means releasably suspending each of said items above said hopper,
  a money accepting mechanism,
  a delivery lever movable to a first, inactive position and to a second, active position,
  release means operable upon the deposit of a predetermined amount of money in said money accepting mechanism and upon movement of said delivery lever to its second position to release the selected item into the delivery hopper for delivery to a purchaser,
  means operable upon movement of said delivery lever to its second position to de-energize said motor as long as said delivery lever is in said second position, a punch movable with said scanning head for mutilating said list, and means operable by the passage of a released item through said hopper to actuate said punch to mutilate said list at a point in alignment with the item selected by said scanning head.

4. A vending machine including:

a list displaying the names of a plurality of items available for sale, a scanning head movable relative to said list into registration with an item on said list, a delivery hopper, a plurality of individual supporting brackets arranged in a row, each releasably engaging one of the items whose names appear on said list to suspend the same over said hopper, means mounting each of said supporting brackets for movement to a first position and to a second position, means for retaining an item-engaging bracket in said first position, means operative to move a bracket which is not engaging an item to its second position a single release mechanism movable into registration with any one of said supporting means and operable to disengage said supporting means from the corresponding item to drop said item into said hopper, means for moving said scanning head into registration with the name of an item on said list, means for moving said release mechanism synchronously with said scanning head and transversely of said row, whereby movement of said scanning head into registration with the name of an item on the list also moves said release mechanism into registration with the supporting means of the corresponding item, item delivery means for actuating said release mechanism to disengage said the corresponding item from its supporting means, a "sold-out" signal, and a normally open switch connected to said signal and located in the path of movement of said bracket to its second position whereby disengagement of a bracket from its item closes said switch to energize said "sold-out" signal.

5. A vending machine including a list bearing the names of items available for sale, a scanning head movable relative said list, means for moving said head into registration with the name of a selected item on said list, a delivery hopper, a plurality of individual, item-supporting brackets, each releasably engageable with one of the items on said list to suspend said item over said hopper, means mounting said brackets for movement to a first and second position, means for retaining a bracket which is supporting an item in said first position, means operative to move a bracket which is not supporting an item to its second position, a single release mechanism movable into registration with any one of said brackets and operative to release the item carried by bracket, means for moving said release mechanism, synchronously with the movement of said scanning head, into registration with said selected item, a single delivery means for activating said release mechanism to disengage said selected item from its supporting bracket, a "sold-out" signal, and normally open switches connected to said "sold-out" signal and located in the paths of movement of the respective brackets to their second positions whereby the release of any item from its supporting bracket permits movement of such bracket to its second position to close said switch and energize said "sold-out" signal.

6. A vending machine including a price-list bearing the names of items available for sale, a price-indicating panel having a plurality of normally non-energized indicia representing currency units and fractions and multiples thereof, said list having coded apertures corresponding to said currency units, fractions and multiples, a scanning head movable into registration with a selected item and with the coded apertures apertaining to said item, electrical terminals accessible through said apertures, contacts carried by said scanning head and engageable with said terminals through said apertures, and electric circuits connecting said contacts and said terminals to said indicia, whereby the indicia corresponding to the selected item will be energized to indicate the price of said item.

7. The machine defined in claim 6 and additional signals corresponding, and complementary to the first mentioned signals, a money-accepting mechanism, and electric circuits including said additional signals and said money-accepting mechanism for energizing said additional signals to indicate the money paid on account of the price of the selected item.

References Cited by the Examiner
UNITED STATES PATENTS

| | | | |
|---|---|---|---|
| 2,635,731 | 4/53 | Dohman. | |
| 2,655,242 | 10/53 | Chafin et al. | 194—10 |
| 2,665,343 | 1/54 | Benson. | |
| 2,708,996 | 5/55 | Skillman | 194—10 |
| 2,840,274 | 6/58 | Arnett et al. | 222—2 X |
| 2,906,385 | 9/59 | Groves | 194—10 |
| 3,023,874 | 3/62 | Zindel | 194—10 |

SAMUEL F. COLEMAN, *Primary Examiner.*

ERNEST A. FALLER, Jr., *Examiner.*